(12) United States Patent
Uemori et al.

(10) Patent No.: US 9,126,468 B2
(45) Date of Patent: Sep. 8, 2015

(54) SPRING SEAT (71) Applicant: HONDA MOTOR CO., LTD., Minato-Ku, Tokyo (JP)

(72) Inventors: Kosuke Uemori, Saitama (JP); Kazunori Abe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/705,294

(22) Filed: Dec. 5, 2012

(65) Prior Publication Data
US 2013/0175747 A1 Jul. 11, 2013

(30) Foreign Application Priority Data

Jan. 5, 2012 (JP) ................................. 2012-000604

(51) Int. Cl.
*F16F 1/12* (2006.01)
*B60G 11/16* (2006.01)
*B60G 3/20* (2006.01)
*B60G 3/22* (2006.01)

(52) U.S. Cl.
CPC ............... *B60G 11/16* (2013.01); *B60G 3/202* (2013.01); *B60G 3/22* (2013.01); *B60G 2202/12* (2013.01); *B60G 2204/1244* (2013.01); *F16F 1/126* (2013.01); *F16F 1/128* (2013.01)

(58) Field of Classification Search
CPC ............. F16F 1/126; F16F 1/128; F16F 9/38
USPC ............... 267/179, 248, 254, 33; 188/322.12; 280/124.151
See application file for complete search history.

(56) References Cited

U.S. PATENT DOCUMENTS

| | | | | |
|---|---|---|---|---|
| 2,896,941 | A * | 7/1959 | Stump | 267/49 |
| 3,086,792 | A * | 4/1963 | Schultz | 280/124.142 |
| 4,822,072 | A * | 4/1989 | Preslicka et al. | 280/124.154 |
| 5,649,691 | A * | 7/1997 | Handke et al. | 267/64.21 |
| 7,090,058 | B2 * | 8/2006 | Miyazaki et al. | 188/322.12 |
| 7,445,202 | B2 * | 11/2008 | Lamb | 267/179 |
| 7,631,882 | B2 * | 12/2009 | Hirao et al. | 280/6.157 |

(Continued)

FOREIGN PATENT DOCUMENTS

| | | |
|---|---|---|
| CN | 101445027 A | 6/2009 |
| EP | 1 564 432 A2 | 8/2005 |
| JP | 2010-007772 A | 1/2010 |

OTHER PUBLICATIONS

Chinese Office Action issued Jul. 23, 2014 in the corresponding CN Patent Application 201210451089.4.

(Continued)

*Primary Examiner* — Bradley King
(74) *Attorney, Agent, or Firm* — Carrier Blackman & Associates, P.C.; Joseph P. Carrier; William D. Blackman (57) ABSTRACT

A spring seat is interposed between a spring and a suspension arm supporting the spring. The spring seat includes a support portion for supporting the spring, and an upright partition portion disposed on one side of the spring seat in a lateral direction of the spring seat. The upright partition portion is formed integrally with the support portion for covering a side surface of the spring. The suspension arm includes a recessed portion supporting the spring, and the partition portion has a height equal to or greater than a height of the recessed portion. The partition portion includes a guide surface for upward or laterally guiding foreign matters coming from an outside of the spring seat in the lateral direction of the spring seat.

18 Claims, 10 Drawing Sheets (56) References Cited

U.S. PATENT DOCUMENTS 7,967,280 B2 * 6/2011 Crabtree .................. 267/64.27
8,047,340 B2 * 11/2011 Abe .......................... 188/266.6
2009/0134596 A1 * 5/2009 Takahashi et al. ..... 280/124.179

OTHER PUBLICATIONS

Canadian Office Action issued in the corresponding CA Patent Application 2,798,639 and received Mar. 5, 2014.

* cited by examiner

FIG.9B (EMBODIMENT)

FIG.9A (COMPARATIVE EXAMPLE)

SPRING SEAT

FIELD OF THE INVENTION

The present invention relates to a spring seat interposed between a spring and a suspension arm supporting the spring.

BACKGROUND OF THE INVENTION

A suspension coil spring disposed between a member on a side of a vehicle body and a member on a side of a vehicle wheel includes a lower end having a first turn defining an end turn and a second turn larger in diameter than the first turn. The lower end of such a coil spring is resiliently received by a spring seat. The spring seat includes a resinous seat portion disposed on a suspension arm and a rubber seat portion receiving the coil spring. The rubber seat portion has a recess receiving the end turn of the coil spring.

Since the spring seat is formed from the resinous seat portion and the rubber seat portion, the spring seat can steadily receive the lower end of the coil spring for a long period of time. Such a spring seat is known from, for example, JP-A-2010-007772.

A spring seat disclosed in JP-A-2010-007772 includes a resinous seat portion provided on a suspension arm and a rubber seat portion receiving a coil spring. The rubber seat portion has a recess receiving an end turn of the coil spring. When a vehicle including this spring seat is used in a cold area, rainwater may be accumulated in the recess of the rubber seat portion of the spring seat and frozen into ice, thereby filling the recess. This may result in unexpended stress being caused.

Suspension components are relatively highly rigid to provide for a sufficient safety factor. It is desirable that a load such as frozen rainwater on these components be reduced as much as possible with a view to make the components lighter and reliable.

That is, when rainwater is accumulated in a space defined in a suspension arm and frozen into ice, it is necessary to provide a structure designed to get rid of blocks of ice in the space. It is noted that frozen rainwater may contain snow or mud.

SUMMARY OF THE INVENTION

An object of the present invention is to provide a technique for limiting clinging of foreign matters (such as ice, snow and mud) to a spring.

Another object of the present invention is to provide a spring seat designed such that foreign matters clung to one end portion of the spring and the spring seat can be separated into small pieces.

A still another object of the present invention is to provide a spring seat designed to upward or laterally guide foreign matters for discharge of the foreign matters.

According to a first aspect of the present invention, there is provided a spring seat interposed between a spring and a suspension arm supporting the spring, the spring seat comprising: a support portion for supporting the spring; and an upright partition portion disposed on one side of the spring seat in a lateral direction of the spring seat, the upright partition portion being formed integrally with the support portion for covering a side surface of the spring.

The upright partition portion, which is formed integrally with the support portion and covering the side surface of the spring, limits clinging of foreign matters (ice, snow and mud) to the spring.

Preferably, the suspension arm includes a recessed portion supporting the spring, and the partition portion has a height equal to or greater than a height of the recessed portion.

The partition portion has the height equal to or greater than the height of the recessed portion, thereby dividing a space defined by the recessed portion. With the space of the recessed portion being divided by the partition portion, sizes of foreign matters clung to a lower end portion of the spring and the spring seat can be broken into small pieces. As a result, an increase in the sizes of the foreign matters can be limited.

Preferably, the partition portion includes a guide surface for upward or laterally guiding foreign matters coming from an outside of the spring seat in the lateral direction of the spring seat.

By the guide surface of the partition portion, foreign matters between the partition portion and the lower end portion of the spring as well as between the partition portion and members (the damper unit etc.) located laterally outward of the spring can be guided upward or laterally for discharge of the foreign matters.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

As shown in FIGS. 1 to 4, a suspension system 20 is a multi-link rear suspension for swingably mounting a vehicle wheel 14 to a body 11 of a vehicle. The suspension system 20 includes a knuckle 21 for rotationally supporting the vehicle wheel 14, and a suspension arm (lower arm) 22 extending from the vehicle body 11 to the knuckle 21, a trailing arm 23 extending from the vehicle body 11 to the knuckle 21, and a control arm 24 extending from the vehicle body 11 to the knuckle 21. The suspension system 20 further includes a spring 25 interposed between the vehicle body 11 and the suspension arm 22, a damper unit 26 interposed between the vehicle body 11 and the suspension arm 22, and a spring seat 30 interposed between the spring 25 and the suspension arm 22.

The suspension arm 22 extends laterally of the vehicle body 11. The suspension arm 22 carries a first support member 31 pivotally supported by the vehicle body 11 and a second support member 32 pivotally supported by the knuckle 21. The suspension arm 22 includes a recessed portion 33 supporting the damper unit 26 and the spring 25.

The recessed portion 33 includes a spring seat carrier 36 located closer to the first support member 31 than to the second support member 32. The spring seat carrier 36 carries the spring seat 30, supporting the spring 25. The recessed portion 33 also includes a damper support 37 located closer to the second support member 32 than to the first support member 31. The damper support 37 supports the damper unit 26. The recessed portion 33 receives therein a lower end portion of the spring 25 and a unit arm attachment portion 55 of the damper unit 26 attached to the damper support 37.

The spring seat carrier 36 has an opening 38 for drainage of rainwater etc. The damper support 37 has an opening 39 for downward drainage of rainwater etc.

The trailing arm 23 is an arm extending longitudinally of the vehicle body 11. The trailing arm 23 includes a first support portion 41 pivotally supported by the vehicle body 11 and upper and lower second support portions 42, 43 attached to the knuckle 21.

The control arm 24 is an arm extending obliquely downward from the vehicle body 11. The control arm 24 carries a first support member 46 pivotally attached to the vehicle body 11 and a second support member 47 pivotally attached to the knuckle 21.

The damper unit 26 is a hydraulic damper for damping a load applied from the suspension arm 22 to the vehicle body 11. The damper unit 26 includes an attachment portion 51 attached to the vehicle body 11. The unit arm of the damper unit 26 has the attachment portion 52 attached to the suspension arm 22.

The knuckle 21 includes a first attachment portion 54 pivotally attached to the suspension arm 22 and upper and lower second attachment portions 55, 56 attached to the trailing arm 23. The knuckle 21 further includes a third attachment portion 57 attached to the control arm 24. The knuckle 21 has a through-hole 58 rotatably supporting an axle 15 of the vehicle wheel 14.

As shown in FIGS. 4 to 8, the spring 25 is a coil spring absorbing a force applied from the vehicle wheel 14. The spring 25 has the lower end portion seated on the spring seat 30 carried on the spring seat carrier 36 and an upper end portion supported by the vehicle body 11. The lower end portion of the spring 25 has a lateral side surface 25c covered by a partition portion 63 of the spring seat 30.

The spring seat 30 is a member interposed between one end (a lower end) 25a of the spring (coil spring) 25 and the suspension arm 22 for the purpose of reducing noise and vibration of the vehicle body 11. That is, the spring seat 30 is interposed between the spring 25 and the suspension arm 22 supporting the spring 25. The spring seat 30 is made from resin material having water repellency. Preferably, the spring seat 30 is made from a material from which little or no snow or ice may be easily removed under freezing condition.

The spring seat 30 includes a support portion 61 supporting the spring 25, a flange portion 62 extending from the support portion 61 toward the damper unit 26, and the partition portion 63 disposed adjacent to the damper unit 26 and covering a lateral side surface 25c of the spring 25.

The support portion 61 of the spring seat 30 is ring-shaped and has a generally annular outer wall 65 receiving an outer peripheral surface of the spring 25. The support portion 61 defines an opening 66 providing an access to an inner peripheral surface of the spring 25. The support portion 61 further includes a plurality of inner walls 67 rising from an edge of the opening 66. The flange portion 62 extends generally horizontally toward the damper unit 26. The flange portion 62 has a plurality of upper reinforcing ribs 71 formed on an outer surface thereof. The flange portion 62 further has a plurality of lower reinforcing ribs 72 formed on an inner surface thereof.

The flange portion 62 interconnecting the support portion 61 and the partition portion 63 is relatively low rigid so that the flange portion 62 can deform with its outer edge 73 fixed to the partition portion 63. The deformation of the flange portion 62 is limited due to the reinforcing ribs 71, 72 formed on the flange portion 62 located along an outer periphery of the support portion 61 of the spring seat 30. That is, the flange portion 62 is rigidified to such an extent that the flange portion 62 does not act as a source of noise during normal traveling of the vehicle.

Figure 4:
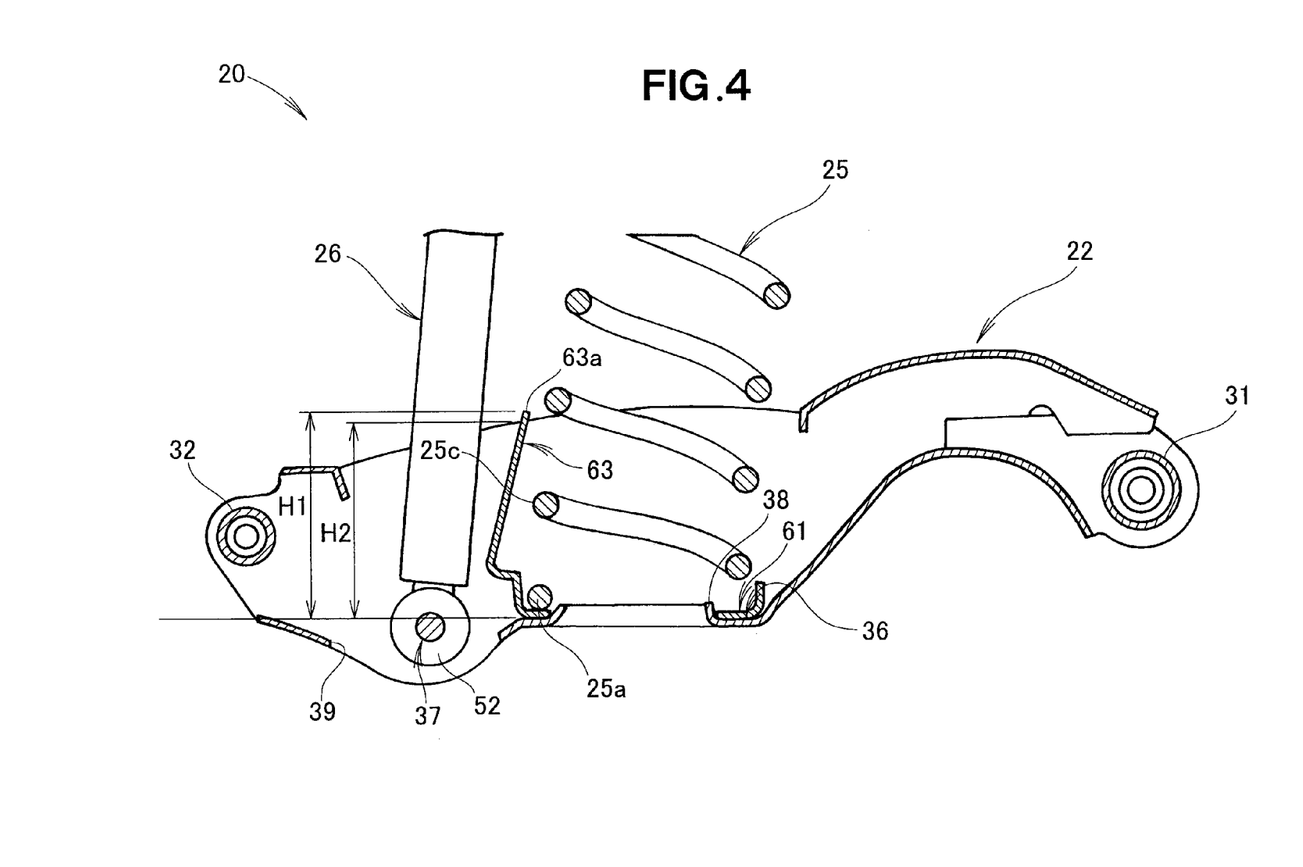
FIG. 4 is a cross-sectional view taken along line 4-4 of FIG. 1.
Figure 5:
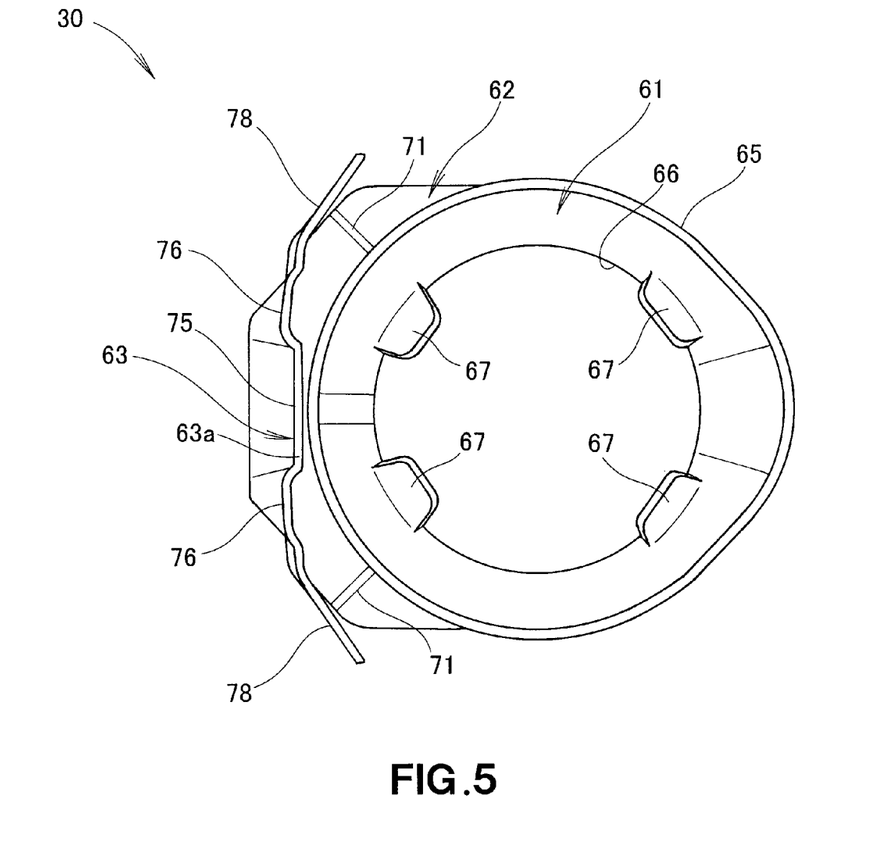
FIG. 5 is a plan view of the spring seat.
Figure 6:
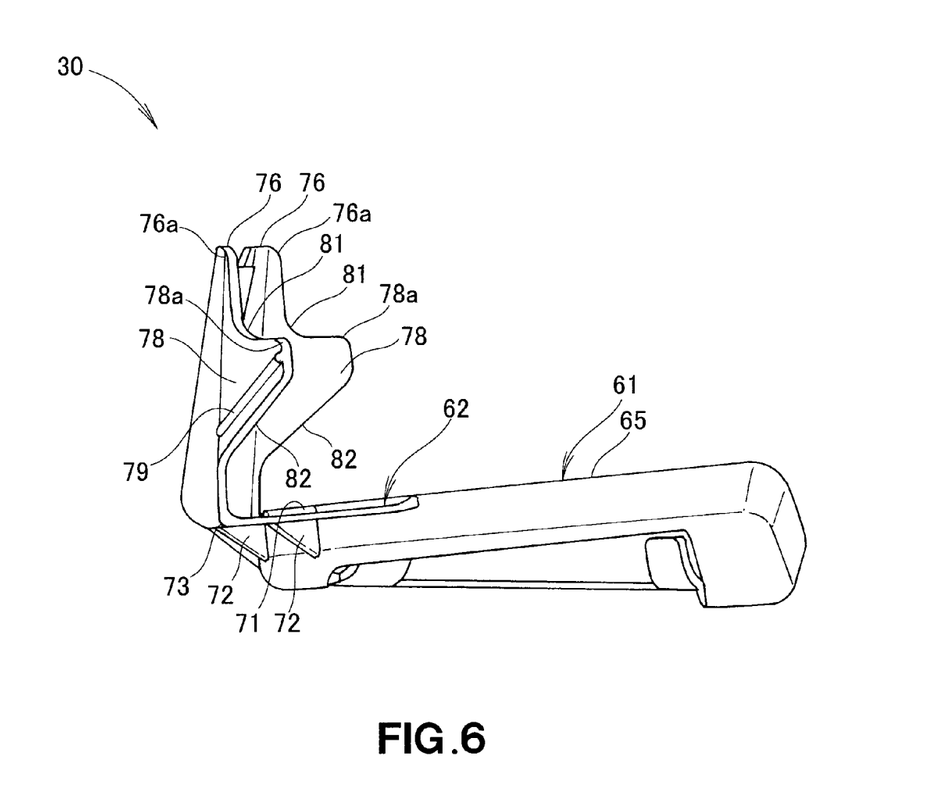
FIG. 6 is a front elevation view of the spring seat shown in FIG. 4.
Figure 7:
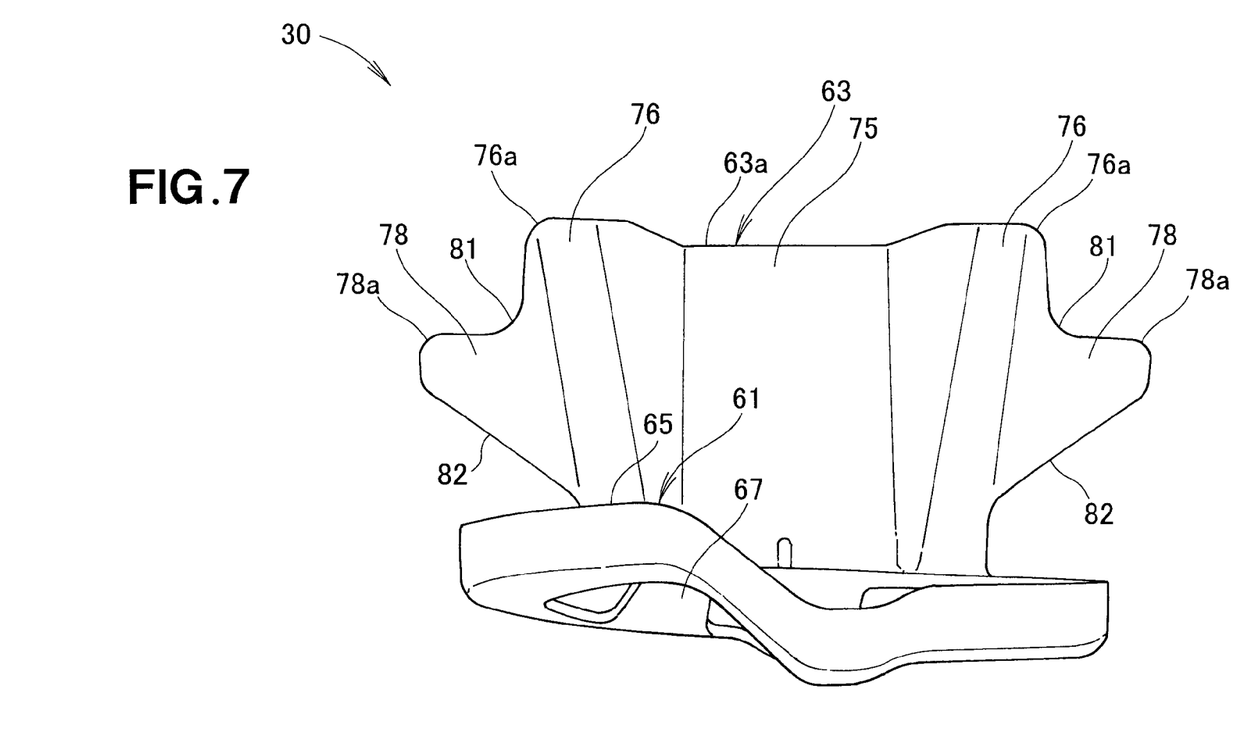
FIG. 7 is a left elevation view of the spring seat shown in FIG. 4.

The partition portion 63 disposed in an upright position is formed integrally with the support portion 61 at a laterally outer side of the spring seat 30. The partition portion 63 has a height equal to or larger than a height of the recessed portion 33. As shown in FIG. 4, namely, when the height of the partition portion 63 is designated at H1 and the height of the recessed portion 33 around a distal end 63a of the partition portion 63 is designated at H2, a relationship between the height H1 and the height H2 is expressed as H1 H2. As depicted the height H1 of the partition portion 63 is significantly greater than a width of the flange portion 62 in a direction projecting radially outward from the annular outer wall of the ring-shaped support portion 61.

The partition portion 63 includes a guide surface (a guide wall) 75 formed centrally thereof. The partition portion 63 includes upright sidewalls 76, 76 at opposite sides of the guide surface 75, and auxiliary walls 78, 78 bent from the sidewalls 76, 76 toward the spring 25.

The guide surface 75 of the partition portion 63 has a recess-shaped cross-section facing the damper unit 26. The guide surface 75 has a function of upward or laterally guiding foreign matters coming from a lateral outward direction of the vehicle. The guide surface 75 extends obliquely upward so that the guide surface 75 is inclined to the spring 25. In other words, the guide surface 75 extends obliquely upward in a direction towards a central axis of the ring-shaped support portion.

The upright sidewall 76 has a U-shaped cross-section. The upright sidewall 76 has a polygonal (or rounded) top end 76a adapted to clear water therefrom.

The auxiliary wall 78 is bent at an obtuse angle to the upright sidewall 76. The auxiliary wall 78 has a polygonal (or rounded) top end 78a adapted to clear water therefrom.

The auxiliary wall 78 has upper and lower cutouts 81, 82 so that the auxiliary wall 78 extends from a vertically middle portion of the upright sidewall 76 of the partition portion 63. The auxiliary wall 78 is adapted to allow foreign matters to move along the upper and lower cutouts 81, 82 out of the spring seat 30. The auxiliary wall 78 has a projecting rib 79 for reinforcing the auxiliary wall 78.

Figure 9A:
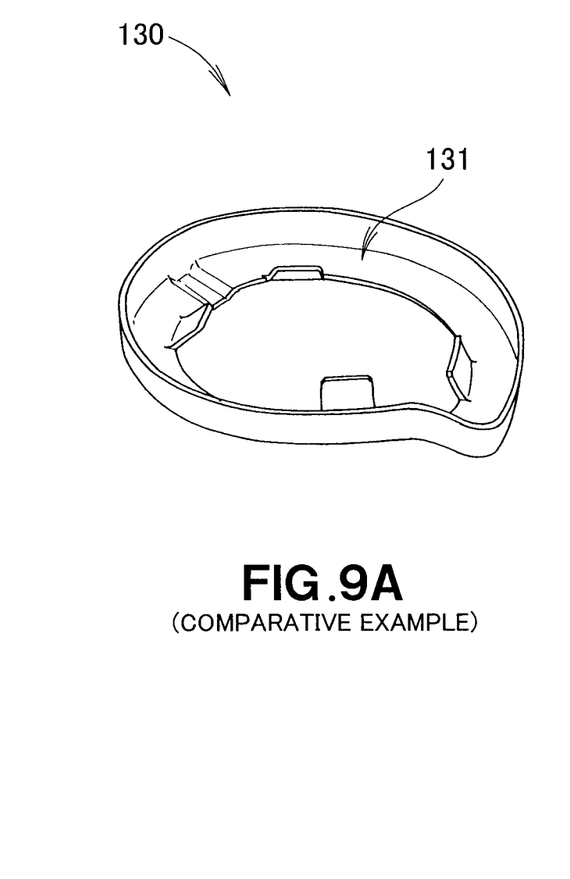
FIG. 9A is a view showing a spring seat in a comparative example and FIG. 9B is a view showing the spring seat.
Figure 9B:
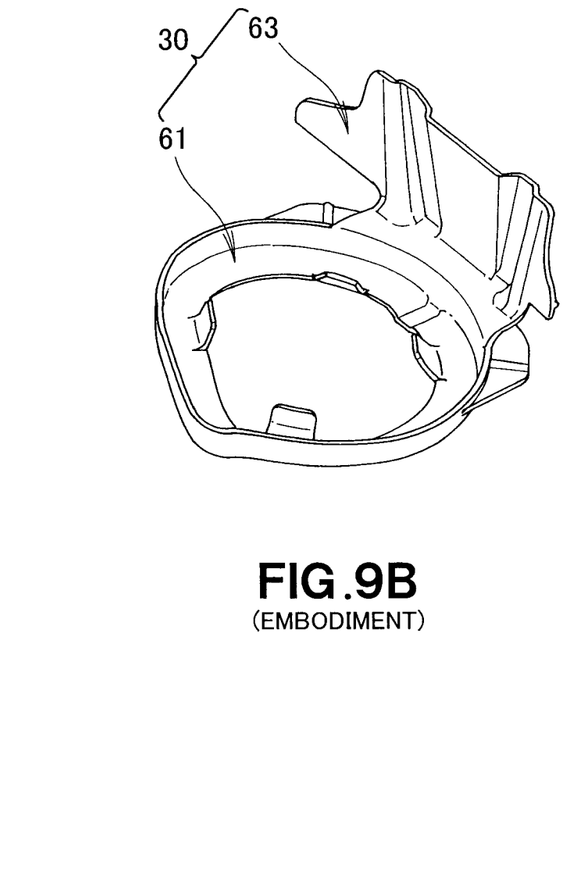

FIG. 9A shows a spring seat 130 in a comparative example and FIG. 9B shows the spring seat 30 in a preferred embodiment of the present invention. The spring seat 130 in the comparative example is adapted to be interposed between a suspension arm and one end of a spring for the purpose of reducing a vibration of a vehicular body and a vibration noise. The spring seat 130 has a support portion 131 alone.

The spring seat 30 in the preferred embodiment includes the partition portion 63 adapted to divide ice made inside the suspension arm (a lower arm) 22, thereby preventing a lower portion of the damper unit 26 and the one end 25a of the spring 25 from freezing together with snow clung to the inside of the suspension arm 22. Discussion will be made with reference to FIG. 10A and FIG. 10B as to why such a freezing is prevented.

Figure 10A:
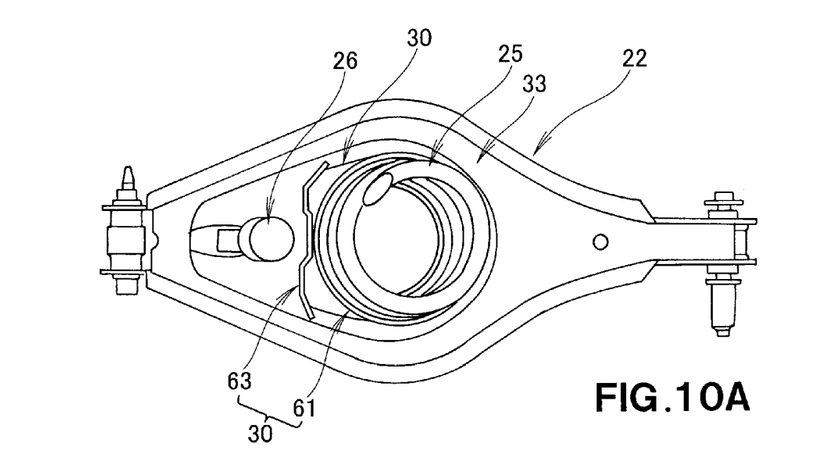
FIG. 10A is a plan view of the suspension arm with the spring seat carried on the suspension arm and FIG. 10B is a view showing a function of a partition portion of the spring seat.

As shown in FIG. 10A, the partition portion 63 of the spring seat 30 is made from resin which can provide a less bonding force between the resin and ice than a bonding force between ice and metal of the suspension arm 22 and the damper unit 26. Due to this resinous partition portion 63 separating the damper unit 26 and the spring 25, volumes of blocks of ice formed around the damper unit 26 and the spring 25 can be small.

Figure 10B:
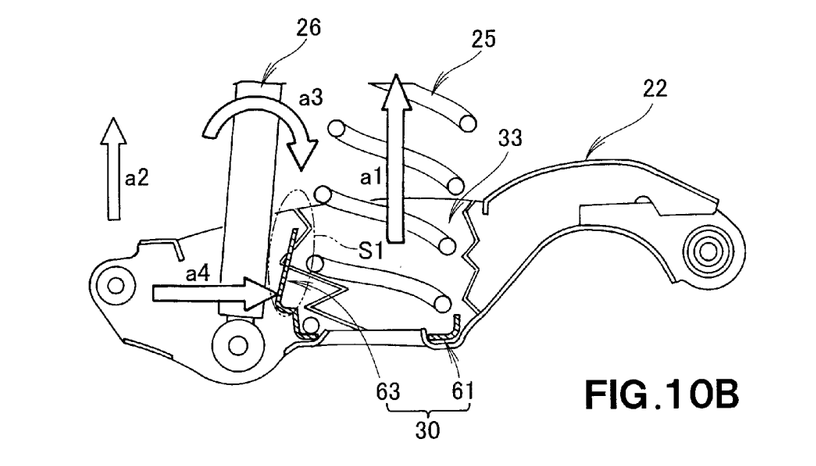

As shown in FIG. 10B, when the suspension arm 22 pivots, a reaction force of the spring 25 lifts up ice around the spring 25, as indicated by an arrow a1, to help the resin (the partition portion 63) between the damper unit 26 and the spring 25 break the ice. As a result, a space S1 containing little or no ice is formed between the damper unit 26 and the spring 25.

Additionally, when the suspension arm 22 moves up and down, as indicated by an arrow a2, the damper unit 26 pivots relative to the suspension arm 22, as indicated by an arrow a3, thereby enlarging the space S1. As a result, ice around the damper unit 26 can shift into the space S1, as indicated by an arrow a4, such that the damper unit 26 can easily move to reduce a load generated between the damper unit 26 and the spring 25.

As shown in FIGS. 1 to 4, the spring seat 30 is interposed between the spring 25 and the suspension arm 22 supporting the spring 25. The spring seat 30 includes the support portion 61 receiving the spring 25 and the upright partition portion 63 disposed on one side (outside) of the spring seat 30 in a lateral direction of the vehicle. The upright partition portion 63 is formed integrally with the support portion 61 and covering the lateral side surface 25c of the spring 25 to limit clinging of foreign matters (ice, snow and mud) to the spring 25.

As shown in FIG. 4, the suspension arm 22 includes the recessed portion 33 supporting the spring 25.

The partition portion 63 has the height equal to or greater than the height of the recessed portion 33, thereby dividing a space defined by the recessed portion 33. With the space of the recessed portion 33 being divided by the partition portion 63, sizes of foreign matters clung to the lower end portion of the spring 25 and the spring seat 30 can be broken into small pieces. As a result, an increase in the sizes of the foreign matters can be limited.

Figure 1:
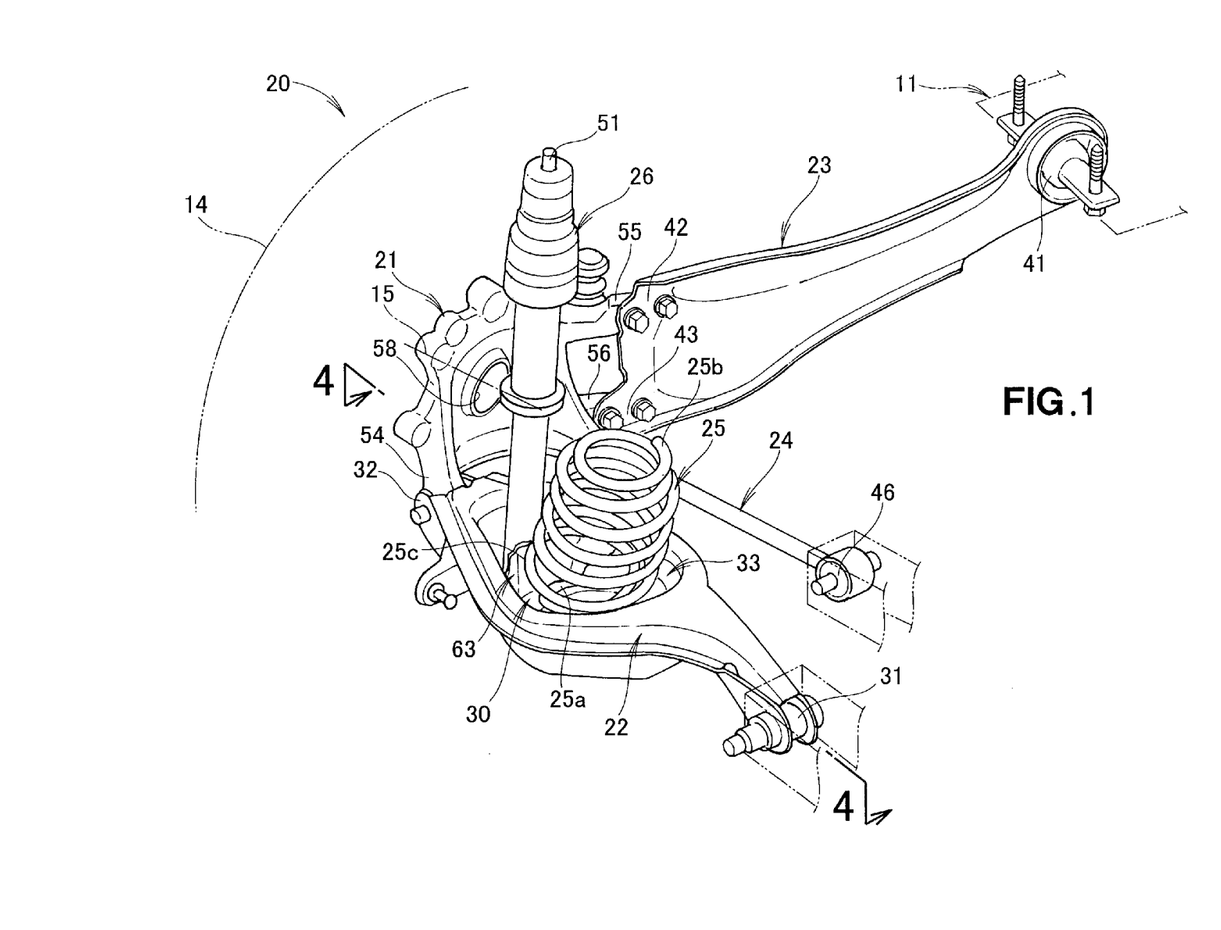
FIG. 1 is a perspective view of a suspension system employing a spring seat in a preferred embodiment of the present invention.
Figure 2:
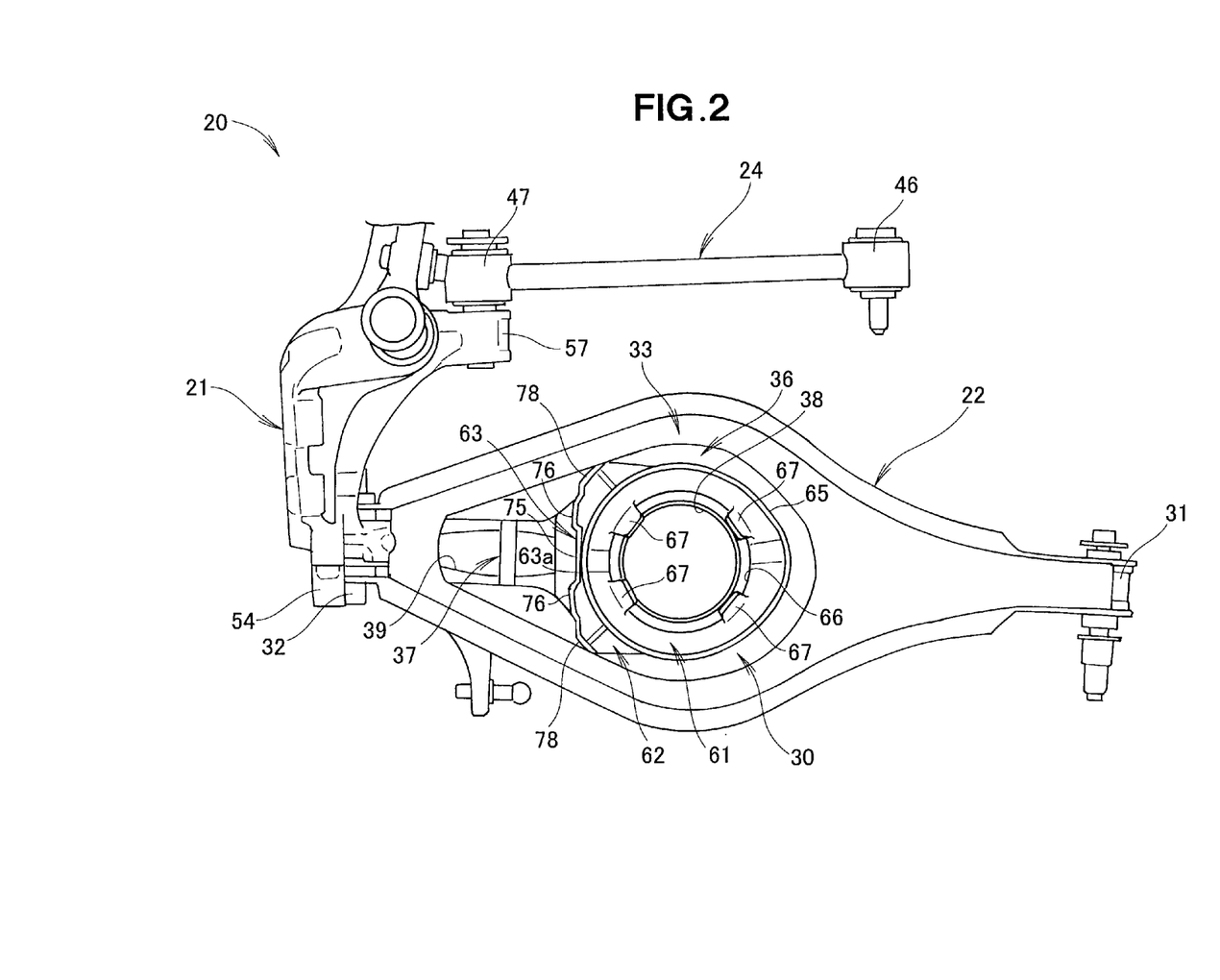
FIG. 2 is a plan view of the suspension system shown in FIG. 1.
Figure 3:
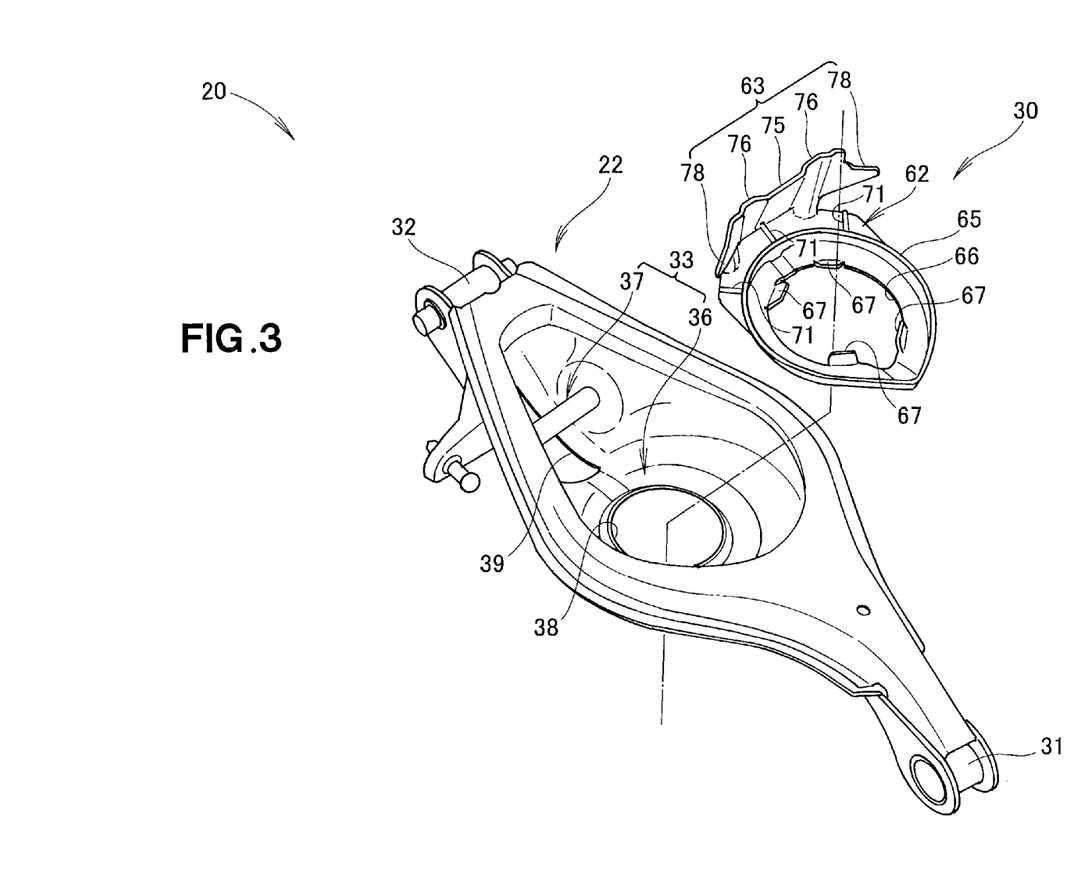
FIG. 3 is an exploded perspective view of the suspension system shown in FIG. 1 with a suspension arm and a spring seat being disassembled.
Figure 8:
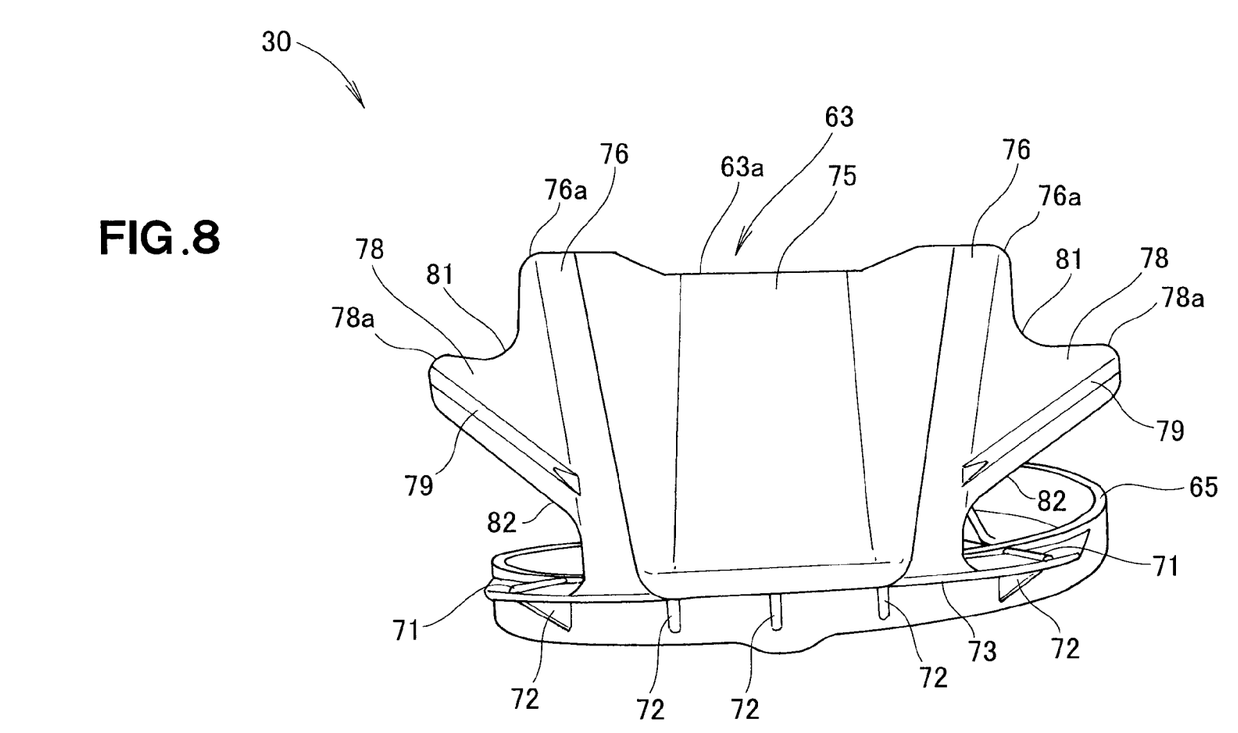
FIG. 8 is a right elevation view of the spring seat shown in FIG. 4.

As shown in FIG. 1 and FIG. 8, the partition portion 63 has the guide surface 75 for upward or laterally guiding foreign matters coming from the lateral outward direction of the vehicle. By the guide surface 75 of the partition portion 63, foreign matters between the partition portion 63 and the lower end portion of the spring 25 as well as between the partition portion 63 and members (the damper unit 26 etc.) located laterally outward of the spring 25 can be guided upward or laterally for discharge of the foreign matters. Further, tensioning or compression of the spring 25 or movement of the damper unit 26, as is discussed with reference to FIG. 10, moves foreign matters upward or laterally along the guide surface 75.

The partition portion 63 may be disposed opposite from the damper unit 26 with the spring 25 located between the damper unit 26 and the partition portion 63, rather than adjacent the damper unit 26 as shown in FIG. 1 to FIG. 4. The appropriated increased number of the partition portions may be used in place of only one partition portion 63 adjacent the damper unit 26.

The guide surface 75 of the partition portion 63 may extend obliquely upward so that the guide surface 75 is inclined away from the spring 25 rather than toward the spring 25.

The spring seat according to the present invention is suitable for use in a suspension system of a passenger car.

Obviously, various minor changes and modifications of the present invention are possible in light of the above teaching. It is therefore to be understood that within the scope of the appended claims the invention may be practiced otherwise than as specifically described.

What is claimed is:

1. A spring seat for being interposed between a suspension arm extending in a width direction of a vehicle and a coil spring mounted in a recessed portion of the suspension arm, the spring seat comprising:
   a ring-shaped support portion having an annular outer wall configured to be mounted in the recessed portion of the suspension arm and receive an outer peripheral surface of the coil spring;
   a flange portion integral with the annular outer wall of the ring-shaped support portion and projecting radially outward from the annular outer wall such that when the spring seat is mounted in the recessed portion of the suspension arm the flange portion will extend away from the annular outer wall in a direction aligned with the width direction of the vehicle; and
   an upright partition portion integral with the flange portion and extending vertically upward from a distal end of the flange portion beyond an upper end of the annular outer wall of the ring-shaped support portion, and includes a section which extends obliquely upward in a direction towards a central axis of the ring-shaped support portion whereby the upright partition is configured to cover an outer side surface of the coil spring when the spring seat is mounted in the recessed portion of the suspension arm.

2. The spring seat of claim 1, wherein a height of the partition portion is greater than a width of the flange portion in a direction projecting radially outward from the annular outer wall.

3. The spring seat of claim 1, wherein the section of the partition portion includes a central guide wall inclined obliquely upward in the direction towards a central axis of the ring-shaped support portion, such that the central guide wall is configured to be inclined toward the outer side surface of the coil spring for upwardly or laterally guiding foreign matters coming from an outside of the spring seat in the width direction of the vehicle when the spring seat is mounted in the recessed portion.

4. The spring seat of claim 3, wherein the partition portion further includes upright sidewalls disposed adjacent to opposite sides of the guide wall, and auxiliary walls disposed adjacent to sides of respective ones of the upright side walls opposite to the guide wall, the auxiliary walls having upper and lower cutouts.

5. The spring seat of claim 4, wherein each of the upright sidewalls has a rounded top end and each of the auxiliary walls has a rounded top end.

6. The spring seat of claim 4, wherein the auxiliary wall has a projecting rib for reinforcing the auxiliary wall.

7. The spring seat of claim 1, wherein the spring seat is made entirely from water-repellent resin.

8. The spring seat of claim 4, wherein each of the auxiliary walls is bent from an adjacent one of the side walls so that it is configured to extend toward the coil spring when the spring seat is mounted in the recessed portion of the suspension arm.

9. The spring seat of claim 3, wherein the central guide wall of the partition portion has a recess-shaped cross-section facing in a direction which extends away from the coil spring when the spring seat is mounted in the recessed portion of the suspension arm.

10. A suspension system for a vehicle, comprising:
    a suspension arm extending in a width direction of the vehicle and having a recessed portion;
    a spring seat mounted in the recessed portion of the suspension arm; and
    a coil spring having one end seated on the spring seat,
    wherein the spring seat includes:
        a ring-shaped support portion having an annular outer wall for receiving an outer peripheral surface of the coil spring;
        a flange portion integral with the annular outer wall of the ring-shaped support portion and projecting radially outward from the annular outer wall in a direction aligned with the width direction of the vehicle; and
        an upright partition portion integral with the flange portion and extending vertically upward from a distal end of the flange portion beyond an upper end of the annular outer wall of the ring-shaped support portion and including a section which extends obliquely upward in a direction towards a central axis of the ring-shaped support portion so as to cover an outer side surface of the coil spring.

11. The suspension system of claim 10, wherein the partition portion has a height equal to or greater than a height of the recessed portion of the suspension arm.

12. The suspension system of claim 10, wherein the section of the partition portion includes a central guide wall inclined toward the outer side surface of the coil spring for upwardly or laterally guiding foreign matters coming from outside of the spring seat in the width direction of the vehicle.

13. The suspension system of claim 12, wherein the central guide wall of the partition portion has a recess-shaped cross-section facing in a direction away from the coil spring.

14. The suspension system of claim 12, wherein the partition portion further includes upright sidewalls disposed adjacent to opposite sides of the central guide wall, and auxiliary walls disposed adjacent to sides of respective ones of the upright sidewalls opposite to the guide wall, the auxiliary walls having upper and lower cutouts.

15. The suspension system of claim 14, wherein the auxiliary walls are bent from an adjacent one of the sidewalls toward the coil spring.

16. The suspension system of claim 14, wherein each of the upright sidewalls has a rounded top end and each of the auxiliary walls has a rounded top end.

17. The suspension system of claim 14, wherein each of the auxiliary walls has a projecting rib for reinforcing the auxiliary wall.

18. The suspension system of claim 10, wherein the spring seat is made entirely from water-repellent resin.

* * * * *